United States Patent
Zhang et al.

(10) Patent No.: US 10,388,437 B2
(45) Date of Patent: Aug. 20, 2019

(54) ASSEMBLY AND METHOD FOR MANUFACTURING INSULATION LAYER OF ELECTRICAL CONDUCTORS

(71) Applicant: Siemens Energy, Inc., Orlando, FL (US)

(72) Inventors: Chao Zhang, Indian Land, SC (US); Robert E. Ashley, III, Mathews, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 15/647,851

(22) Filed: Jul. 12, 2017

(65) Prior Publication Data

US 2018/0047483 A1 Feb. 15, 2018

Related U.S. Application Data

(60) Provisional application No. 62/373,019, filed on Aug. 10, 2016.

(51) Int. Cl.
*H01B 13/20* (2006.01)
*H02K 15/10* (2006.01)
(Continued)

(52) U.S. Cl.
CPC ............. *H01B 13/202* (2013.01); *H01B 3/04* (2013.01); *H01B 7/02* (2013.01); *H01B 13/148* (2013.01);
(Continued)

(58) Field of Classification Search
CPC ...... H01B 13/202; H01B 7/02; H02K 15/105; B29C 2045/1409; B29C 45/14073
See application file for complete search history.

(56) References Cited

U.S. PATENT DOCUMENTS 2,893,061 A * 7/1959 Terry, Jr. ................. B29C 39/10
264/102
3,829,263 A * 8/1974 Yao ......................... B29C 39/10
264/102
(Continued)

FOREIGN PATENT DOCUMENTS

CN 101964570 A 2/2011
DE 102009008457 A1 8/2010
(Continued)

OTHER PUBLICATIONS

Partial machine translation of JP2851112B2 dated Nov. 1998 which was obtained from espace website. (Year: 1998).*

*Primary Examiner* — Robert B Davis

(57) ABSTRACT

An assembly and a method for manufacturing an insulation layer of an electrical conductor are presented. The electrical conductor is enclosed in a cavity of a mold. Spacers embedded into holes of the mold are movable into the cavity for holding the electrical conductor in the cavity to maintain a gap between the electrical conductor and surface of the cavity. Distance of the gap is defined by thickness of the insulation layer. Spacers are movable into the holes of the mold from the cavity to maintain even surface of the cavity. Insulation compound fills entire gap and is cured to form the insulation layer having homogenous thickness.

20 Claims, 2 Drawing Sheets

(51) Int. Cl.
*B29C 45/14* (2006.01)
*H01B 13/14* (2006.01)
*H01B 13/30* (2006.01)
*H01B 7/02* (2006.01)
*H01B 3/04* (2006.01)
*H02K 3/30* (2006.01)
*H02K 3/12* (2006.01)

(52) U.S. Cl.
CPC ............... *H01B 13/30* (2013.01); *H02K 3/12* (2013.01); *H02K 3/30* (2013.01); *H02K 15/105* (2013.01)

(56) References Cited

U.S. PATENT DOCUMENTS

| | | | | |
|---|---|---|---|---|
| 4,138,460 A | * | 2/1979 | Tigner | B01D 63/022 264/159 |
| 5,753,538 A | * | 5/1998 | Kuno | B29C 45/14655 249/65 |
| 5,770,941 A | * | 6/1998 | Van Den Berg | B29C 33/123 174/520 |
| 6,645,416 B2 | * | 11/2003 | Bock | B29C 45/14065 264/275 |
| 6,840,749 B2 | | 1/2005 | Klee | |
| 8,540,917 B2 | * | 9/2013 | Yamamoto | B29C 33/12 264/261 |
| 2002/0185785 A1 | * | 12/2002 | Thrash | B29C 70/443 264/571 |
| 2005/0104252 A1 | * | 5/2005 | Hirai | H02K 15/12 264/272.19 |

FOREIGN PATENT DOCUMENTS

| | | | | |
|---|---|---|---|---|
| EP | 0831575 A1 | 3/1998 | | |
| JP | 2851112 B2 | * | 1/1999 | ....... B29C 45/14073 |
| JP | 2003142510 A | 5/2003 | | |
| JP | 2008093957 A | 4/2008 | | |
| JP | 2014065176 A | 4/2014 | | |

\* cited by examiner

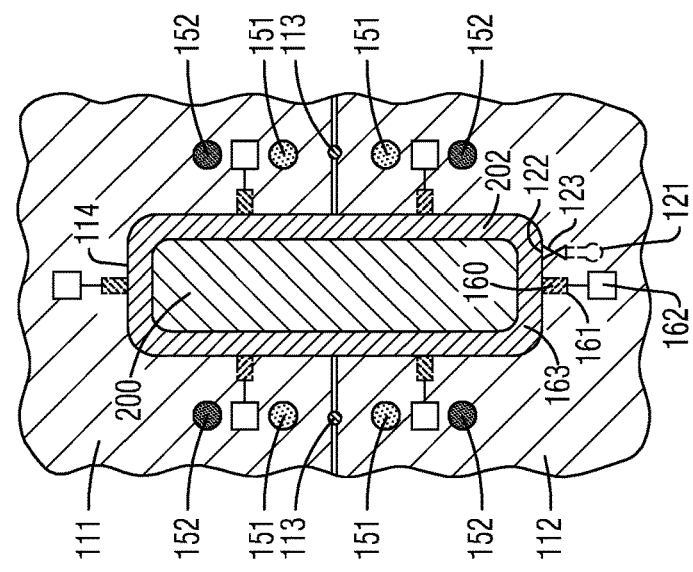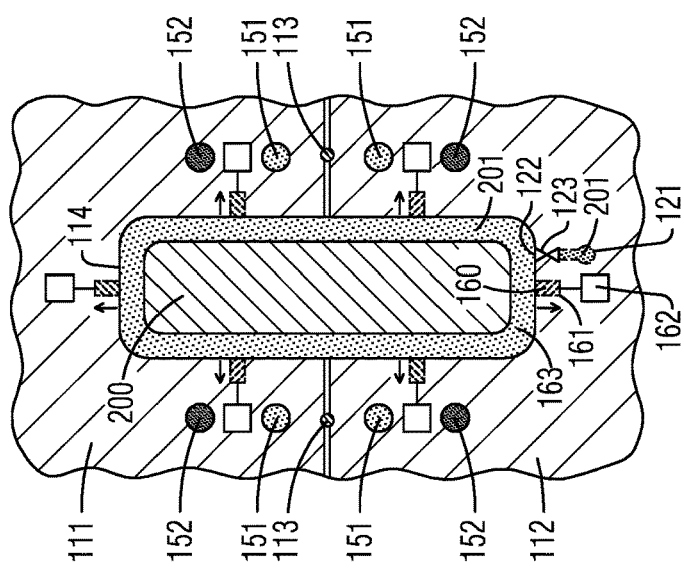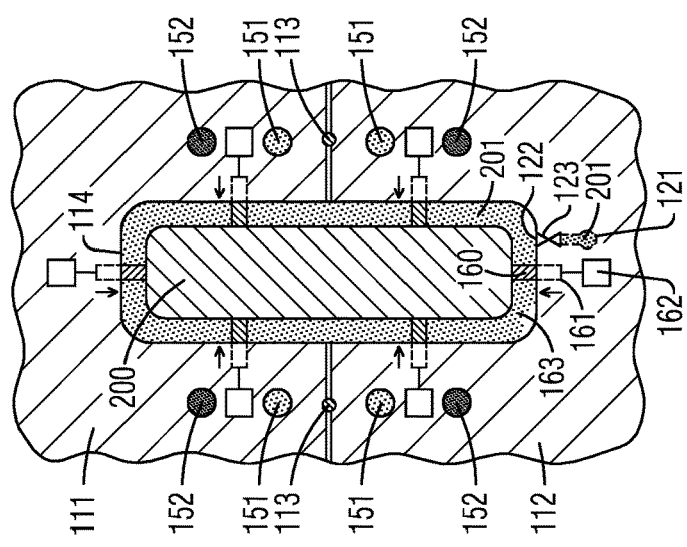

ASSEMBLY AND METHOD FOR MANUFACTURING INSULATION LAYER OF ELECTRICAL CONDUCTORS

TECHNICAL FIELD

This invention relates generally to an assembly and a method for manufacturing an insulation layer of an electrical conductor.

DESCRIPTION OF RELATED ART

An electrical conductor may be used in an electrical machine, such as a power generator or a motor. The electrical conductor may be winding coils. The electrical conductor may need to be insulated by an insulation layer.

Conventionally the insulation layer of the electrical conductor is manufactured by winding the electrical conductor with mica based insulation tape, and then having a resin penetrated or filled insulation region, and forming a cured insulation with mica and resin. Such process may have disadvantages, such as high manufacturing cost, inhomogeneous insulation, etc. The process may use heavily chemical production process, such as Vacuum Pressure Impregnation (VPI).

SUMMARY OF INVENTION

Briefly described, aspects of the present invention relate to an assembly and a method for manufacturing an insulation layer of an electrical conductor.

According to an aspect, an assembly for manufacturing an insulation layer of an electrical conductor is presented. The assembly comprises a mold comprising a cavity for enclosing the electrical conductor. The assembly comprises a supply tank for holding an insulation compound. The assembly comprises a supply line connected to the supply tank and an inlet opening of the cavity for filling the insulation compound into the cavity. The assembly comprises a spacer embedded into a hole of the mold. The hole is connected to the cavity. The spacer is configured to be movable from the hole of the mold into the cavity for holding the electrical conductor in the cavity to maintain a gap between the electrical conductor and a surface of the cavity. The spacer is configured to be movable into the hole of the mold from the cavity to maintain an even surface of the cavity. The insulation compound fills entire gap between the electrical conductor and the surface of the cavity forming the insulation layer.

According to an aspect, a method for manufacturing an insulation layer of an electrical conductor is presented. The method comprises enclosing the electrical conductor into a cavity of a mold. A spacer is embedded into a hole of the mold. The hole is connected to the cavity. The method comprises moving the spacer from the hole of the mold into the cavity for holding the electrical conductor in the cavity to maintain a gap between the electrical conductor and surface of the cavity. The method comprises filling an insulation compound into the cavity from an inlet opening of the cavity through a supply line. The supply line is connected to a supply tank. The method comprises moving the spacer into the hole of the mold from the cavity to maintain an even surface of the cavity. The method comprises continuously filling the insulation compound into the gap until the insulation compound fills entire gap between the electrical conductor and the surface of the cavity forming the insulation layer.

Various aspects and embodiments of the application as described above and hereinafter may not only be used in the combinations explicitly described, but also in other combinations. Modifications will occur to the skilled person upon reading and understanding of the description.

BRIEF DESCRIPTION OF DRAWINGS

Exemplary embodiments of the application are explained in further detail with respect to the accompanying drawings. In the drawings:

FIG. 2A illustrates a schematic enlarged partial cross section view of the assembly according to an embodiment of the invention along line A-A shown in FIG. 1, wherein FIG. 2A illustrates spacers into a cavity, insulation compound being filled gap except spaces occupied by spacers;

FIG. 2B illustrates a schematic enlarged partial cross section view of the assembly according to an embodiment of the invention along line A-A shown in FIG. 1, wherein FIG. 2B illustrates spacers into holes of a mold, insulation compound being filled entire gap; and FIG. 2C illustrates a schematic enlarged partial cross section view of the assembly according to an embodiment of the invention along line A-A shown in FIG. 1, wherein FIG. 2C illustrates insulation compound being cured to a solid insulation layer of an electrical conductor.

To facilitate understanding, identical reference numerals have been used, where possible, to designate identical elements that are common to the figures.

DETAILED DESCRIPTION OF INVENTION

Figure 1:
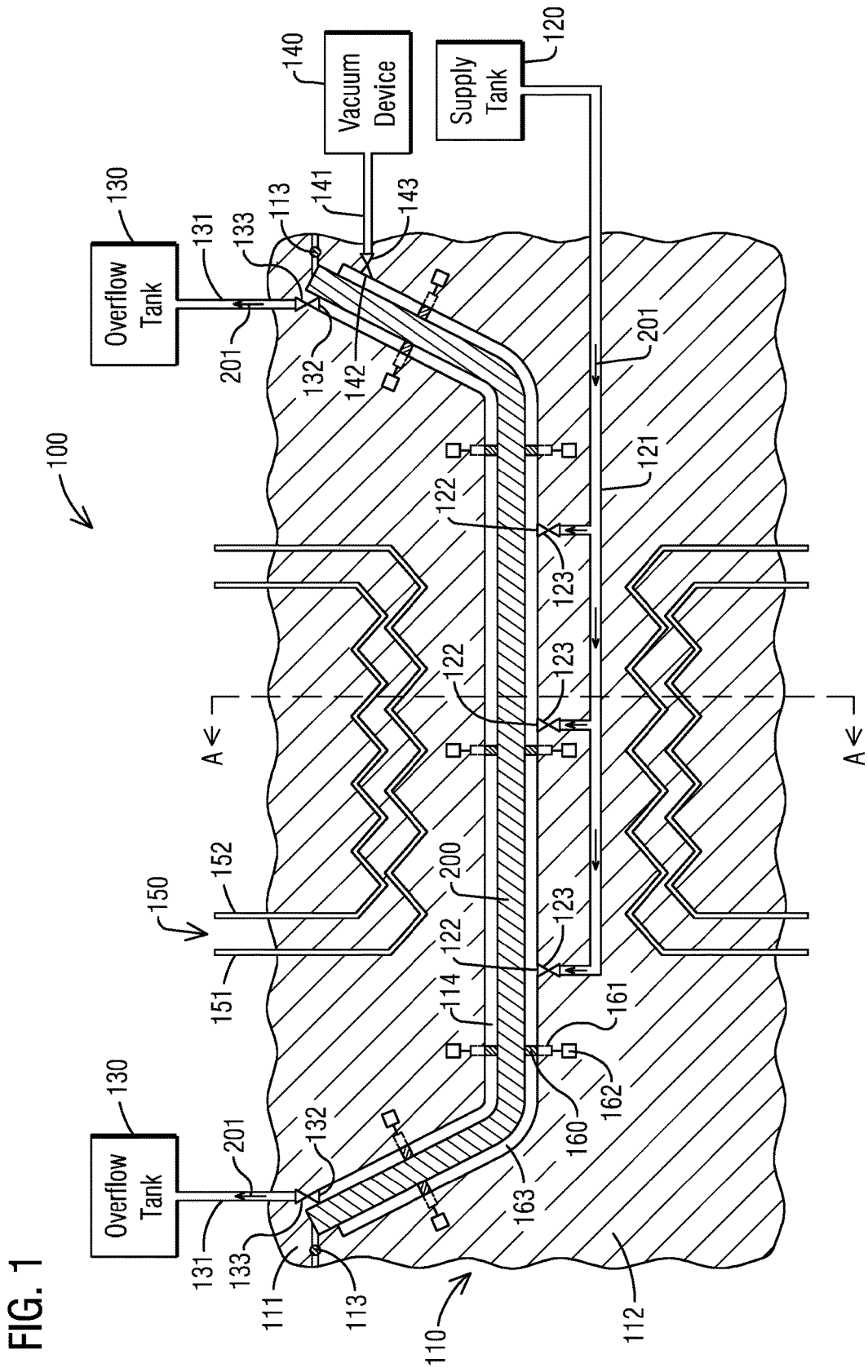
FIG. 1 illustrates a schematic partial cross section side view of an assembly for manufacturing an insulation layer of an electrical conductor according to an embodiment of the invention.

A detailed description related to aspects of the present invention is described hereafter with respect to the accompanying figures.

FIG. 1 illustrates a schematic partial cross section side view of an assembly 100 for manufacturing an insulation layer of an electrical conductor 200 according to an embodiment of the invention. The assembly 100 includes a mold 110. The mold 110 may include a top part 111 and a bottom part 112. A cavity 114 may be formed inside of the mold 110 when the mold 110 is closed by placing the top part 111 to the bottom part 112. An electrical conductor 200 may be enclosed in the cavity 114 of the mold 110. The electrical conductor 200 may be a winding bar of an electrical machine, such as a generator. The mold 110 may be closed after placing the electrical conductor 200 into the cavity 114. Edges between the top part 111 and the bottom part 112 may be sealed by a sealing element 113. The sealing element 113 may maintain a vacuum of the cavity 114 once a vacuum is applied to the cavity 114. The sealing element 113 may include, for example, a silicon rubber seal. In the exemplary embodiment as illustrated in FIG. 1, one cavity 114 is showed inside of the mold 110. According to an embodiment, a plurality of cavities 114 may be formed inside of the mold 110. A plurality of electrical conductors 200 may be enclosed in the plurality of the cavities 114 respectively.

The cavity 114 may include at least one inlet opening 122 for filling an insulation compound 201. The inlet opening 122 may be located at a lower part of the cavity 114 so that air inside of the cavity 114 may be pushed from lower part of the cavity 114 to upper part of the cavity 114 when filling the insulation compound 201 into the cavity 114. Such arrangement may avoid air bubbles inside the insulation compound 201. The cavity 114 may include at least one overflow opening 132 for an overflow of the insulation compound 201. The overflow opening 132 may be located at upper part of the cavity 114 to ensure the cavity 114 is fully filled by the insulation compound 201.

According to an embodiment, the insulation compound 201 may include a filled polymer or a filled organic compound consisting of polymer matrix and inorganic fillers. For example, the polymer matrix of the insulation compound 201 may include epoxy, phenolic, novolac, polyimide, silicone rubber, polyethylene, polypropylene. The inorganic fillers of the insulation compound 201 may include mica, alumina, silica, clay, etc. The insulation compound 201 may also include various functional additives, for example, accelerator for curing, fracture toughness agent, anti-oxidant, additivities for increasing thermal conductivity, etc.

The assembly 100 may include a supply tank 120. The supply tank 120 holds an insulation compound 201. A supply line 121 is connected to the supply tank 120 and the inlet opening 122 of the cavity 114. The insulation compound 201 may be injected from the supply tank 120 into the cavity 114 through the supply line 121 and the inlet opening 122. A supply control valve 123 may be arranged on the supply line 121. The supply control valve 123 is open during filling the insulation compound 201 into the cavity 114. The supply control valve 123 is closed once entire cavity 114 is filled with the insulation compound 201. An even surface of the cavity 114 is maintained at the inlet opening 122 once the supply control valve 123 is closed.

The assembly 100 may include an overflow tank 130. The overflow tank 130 may be connected to an overflow opening 132 of the cavity 114 through an overflow line 131. The overflow tank 130 may receive overflow of the insulation compound 201 from the cavity 114 through the overflow opening 132. An overflow control valve 133 may be arranged on the overflow line 131. The overflow control valve 133 is open during filling the insulation compound 201 into the cavity 114. The overflow control valve 133 is closed once entire cavity 114 is filled with the insulation compound 201. An even surface of the cavity 114 is maintained at the overflow opening 132 once the overflow control valve 133 is closed.

The assembly 100 may include a vacuum device 140. The vacuum device 140 is connected to a vacuum opening 142 of the cavity 114 through a vacuum line 141. The vacuum device 140 may apply a vacuum to the cavity prior to filling the insulation compound into the cavity 114. A vacuum control valve 143 may be arranged on the vacuum line 141. The vacuum control valve 143 is open during applying the vacuum to the cavity 114. The vacuum control valve 143 is closed once a certain degree of the vacuum is achieved in the cavity 114 and maintained for a period of time. An even surface of the cavity 114 is maintained at the vacuum opening 142 once the vacuum control valve 143 is closed.

The assembly 100 may include a curing device 150. The curing device 150 may be embedded into the mold 110. The curing device 150 may include a heating device 151. The curing device 150 may include a cooling device 151. The curing device 150 may maintain the mold 110 at a certain temperature. The curing device 150 may heat and cool the mold 110 based on a curing temperature profile of the insulation compound 201 to cure the insulation compound 201 in the cavity 114.

The assembly 100 may include at least one spacer 160. The spacer 160 may be embedded into a hole 161 of the mold 110. The hole 161 are connected to the cavity 114. The spacer 160 may be movable from the hole 161 of the mold 110 into the cavity 114 for holding the electrical conductor 200 in the cavity 114. The spacer 160 may hold the electrical conductor 200 in the cavity 114 to maintain a gap 163 between the electrical conductor 200 and surface of the cavity 114. Insulation compound 201 may be injected into the gap 163 through the inlet opening 122. The spacer 160 may be movable into the hole 161 of the mold from the cavity 114 to maintain an even surface of the cavity 114. A control device 162 may be functionally connected to the spacer 160 for controlling a movement of the spacer 160. The control device 162 may include, such as a digitized microprocessor. With reference to an exemplary embodiment as illustrated in FIG. 1, the assembly 100 includes a plurality of spacers 160.

FIGS. 2A, 2B and 2C illustrate schematic enlarged partial cross section views of the assembly 100 according to an embodiment of the invention along line A-A shown in FIG. 1. With reference to FIG. 1 and FIG. 2A, spacers 160 are moved from the hole 161 of the mold 110 into the cavity 114. The spacers 160 hold the electrical conductor 200 in the cavity 114 to maintain a gap 163 between the electrical conductor 200 and surface of the cavity 114. Supply control valve 123 is open. Overflow control valve 133 is open. Insulation compound 201 is filled into the gap 163 through the inlet opening 122 from the supply line 121, except spaces occupied by the spacers 160.

With reference to FIG. 1 and FIG. 2B, the spacers 160 are moved into the hole 161 of the mold 110 from the cavity 114 to maintain an even surface of the cavity 114. Insulation compound 201 is continuously filled into the gap 163 to fill up spaces previously occupied by the spacers 160. Supply control valve 123 and overflow control valve 133 are closed after entire gap 163 is filled up by the insulation compound 201. An even surface of the cavity 114 is maintained after the supply control valve 123 and the overflow control valve 133 are closed.

With reference to FIG. 1 and FIG. 2C, residue of the insulation compound 201 in the supply line 121 may be retracted into the supply tank 120 after the supply control valve 123 is closed. Residue of the insulation compound 201 in the overflow line 131 may be retracted into the overflow tank 130 after the overflow control valve 133 is closed. The insulation compound 201 is cured by heating device 151 and cooling device 152 based on a curing temperature profile of the insulation compound 201. The cured insulation compound 201 forms a solid insulation layer 202 of the electrical conductor 200. A distance of the gap 163 is defined by a thickness of the insulation layer 202. The spacer 160 may maintain the entire gap 163 between the electrical conductor 200 and surface of the cavity 114 with a uniform distance. The uniform distance of the gap 163 and even surface of the cavity 114 may provide the insulation layer 202 with a homogeneous thickness.

A process for manufacturing an insulation layer 202 of an electrical conductor 200 according to an exemplary embodiment of the invention may be as follows. Mold 110 is open. Spacers 160 at bottom part 112 of the mold 110 are moved out from holes 161 into cavity 114 with a distance defined by thickness of the insulation layer 202. An electrical conductor 200 may be placed into the cavity 114. The mold 110 is closed by placing top part 111 of the mold 110 to the bottom part 112. Spacers 160 at top part 111 of the mold 110 are moved out from holes 161 into the cavity 114 with the same distance defined by thickness of the insulation layer 202. A gap 163 with a uniform distance between the electrical conductor 200 and surface of the cavity 114 is held by the spacers 160. Edges between the top part 111 and the bottom part 112 is sealed by a sealing element 113. Curing device 150 may maintain the mold 110 and the electrical conductor 200 at a certain temperature. Vacuum control valve 143 is open. A vacuum is applied to the cavity 114 by a vacuum device 140 through a vacuum line 141 and a vacuum opening 142. The vacuum control valve 143 is closed once a certain degree of the vacuum is achieved in the cavity 114 and maintained for a period of time. An even surface of the cavity 114 is maintained at the vacuum opening 142 once the vacuum control valve 143 is closed. Supply control valve 123 is open. Overflow control valve 133 is open. Insulation compound 201 is filled into the gap 163 from a supply tank 120 through a supply line 121 and inlet opening 122. Overflow of the insulation compound 201 flows into an overflow tank 130 through an overflow line 131 and overflow opening 132. Spacers 160 are moved into holes 161 of the mold 110 from the cavity 114 after the gap 163 is filled by the insulation compound 201 except spaces occupied by the spacers 160. An even surface of the cavity 114 is maintained once the spacers 160 are moved into the holes 161. The insulation compound 201 is continuously filled into the gap 163 to fill out the spaces previously occupied by the spacers 160. The insulation compound 201 fills up the entire gap 163 between the electrical conductor 200 and surface of the cavity 114 with a uniform thickness defined by the insulation layer 202. The supply control valve 123 is closed. The overflow control valve 133 is closed. An even surface of the cavity 114 is maintained after the supply control valve 123 and the overflow control valve 133 are closed. Residue of the insulation compound 201 in the supply line 121 may be retracted into the supply tank 120 after the supply control valve 123 is closed. Residue of the insulation compound 201 in the overflow line 131 may be retracted into the overflow tank 130 after the overflow control valve 133 is closed. The insulation compound 201 is cured by heating and cooling the mold 110 using heating device 151 and cooling device 152 based on a certain curing temperature profile until a solid insulation layer 202 of the electrical conductor 200 is formed. The electrical conductor 200 is removed from the mold 110. Post-processing procedures may be applied to the insulation layer 202 of the electrical conductor 200.

According to an aspect, the proposed assembly 100 and method for manufacturing an insulation layer 202 of an electrical conductor 200 may provide a homogeneous insulation layer 202 of the electrical conductor 200. The homogeneous insulation layer 202 may enhance electrical performance of the electrical conductor 200 and reduce electrical insulation fails of the electrical conductor 200 due to inhomogeneous areas.

According to an aspect, the proposed assembly 100 and method for manufacturing an insulation layer 202 of an electrical conductor 200 may provide more flexibility in insulating compound 201 to meet various design requirements for different electrical conductor 200. The proposed embodiments of the invention may provide an easier way to change composition of an insulation compound 201, for example, certain additives may be added into the insulation compound 201 to increase thermal conductivity of the insulation layer 202.

According to an aspect, the proposed assembly 100 and method for manufacturing an insulation layer 202 of an electrical conductor 200 may repair the insulation layer 202 by injecting the same insulation compound 201 as originally manufactured.

According to an aspect, the proposed assembly 100 and method may manufacture an insulation layer 202 of an electrical conductor 200 without winding the electrical conductor 200 with a mica based insulation tape. The proposed method may change production process for manufacturing an insulation layer 202. For example, the proposed method may eliminate Vacuum Pressure Impregnation (VPI) process during manufacturing the insulation layer 202 The proposed method may manufacture an insulation layer 202 of an electrical conductor 200 by injecting and curing.

According to an aspect, the proposed assembly 100 and method for manufacturing an insulation layer 202 of an electrical conductor 200 may provide a plurality of advantages for manufacturing the insulation layer 202 of the electrical conductor 200, for example, significantly manufacturing cost reduction, better electrical performance of the insulation layer 202 of the electrical conductor 200, desired electrical properties of the insulation layer 202 of the electrical conductor 200, and easier repair of the insulation layer 202 of the electrical conductor 200, etc.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Assembly
110: Mold
111: Top Part of Mold
112: Bottom Part of Mold
113: Sealing Element
114: Cavity
120: Supply Tank
121: Supply Line
122: Inlet Opening
123: Supply Control Valve
130: Overflow Tank
131: Overflow Line
132: Overflow Opening
133: Overflow Control Valve
140: Vacuum Device
141: Vacuum Line
142: Vacuum Opening
143: Vacuum Control Valve
150: Curing Device
151: Heating Device
152: Cooling Device
160: Spacer
161: Hole
162: Control Device
163: Gap between Electrical Conductor and Surface of Cavity
200: Electrical Conductor
201: Insulation Compound
202: Insulation Layer

What is claimed is:

1. An assembly for manufacturing an insulation layer of an electrical conductor comprising:
   a mold comprising a cavity for enclosing the electrical conductor, wherein the electrical conductor is a generator winding coil;
   a supply tank for holding an insulation compound;
   a supply line connected to the supply tank and an inlet opening of the cavity for filling the insulation compound into the cavity;
   an overflow tank for holding overflow of the insulation compound;
   a overflow line connected to the overflow tank and to an overflow opening of the cavity;
   a overflow valve arranged on the overflow line to the allow insulation compound flow from the cavity to an overflow tank while the overflow valve is in an open position and to prevent the insulation from exiting the cavity to the overflow tank while the overflow valve is in a closed position; and
   a vacuum line connected to a vacuum device and to a vacuum opening of the cavity, the vacuum opening arranged upstream from the overflow opening in relation to the insulation compound flow from the supply tank,
   a spacer embedded into a hole of the mold, wherein the hole is connected to the cavity,
   wherein the spacer is configured to be movable from the hole of the mold into the cavity for holding the electrical conductor in the cavity to maintain a gap between the electrical conductor and a surface of the cavity,
   wherein the spacer is configured to be movable into the hole of the mold from the cavity to maintain an even surface of the cavity, and
   wherein the insulation compound fills entire gap between the electrical conductor and the surface of the cavity forming the insulation layer.

2. The assembly as claimed in claim 1, wherein a distance of the gap is defined by a thickness of the insulation layer of the electrical conductor.

3. The assembly as claimed in claim 1, further comprising a control device for controlling a movement of the spacer, the control device comprising a microprocessor.

4. The assembly as claimed in claim 1, wherein the mold comprises a top part and a bottom part; and
   a sealing element for sealing an edge between the top part and the bottom part.

5. The assembly as claimed in claim 1, wherein the inlet opening is located at a lower part of the cavity.

6. The assembly as claimed in claim 1, wherein the overflow opening is located at an upper part of the cavity.

7. The assembly as claimed in claim 1, further comprising a curing device for curing the insulation compound.

8. A method for manufacturing an insulation layer of an electrical conductor comprising:
   enclosing the electrical conductor into a cavity of a mold, wherein a spacer is embedded into a hole of the mold, and wherein the hole is connected to the cavity;
   moving the spacer from the hole of the mold into the cavity for holding the electrical conductor in the cavity to maintain a gap between the electrical conductor and surface of the cavity;
   applying a vacuum to the cavity, by a vacuum device, though a vacuum line connected to a vacuum opening in the cavity,
   filling an insulation compound into the gap from an inlet opening of the cavity through a supply line after maintaining a degree of vacuum in the cavity, wherein the supply line is connected to a supply tank;
   moving the spacer into the hole of the mold from the cavity to maintain an even surface of the cavity;
   continuously filling the insulation compound into the gap until the insulation compound fills entire gap between the electrical conductor and the surface of the cavity forming the insulation layer; and
   actuating an overflow valve to shut off the flow of the insulation compound from the cavity to an overflow tank, the overflow valve arranged on an overflow line that is connected to the cavity at an overflow inlet downstream from the inlet opening in relation to a flow of the insulation from the supply tank,
   wherein the electrical conductor is a generator winding coil.

9. The method as claimed in claim 8, wherein a distance of the gap is defined by a thickness of the insulation layer of the electrical conductor.

10. The method as claimed in claim 8, further comprising controlling a movement of the spacer by a control device, the control device comprising a microprocessor.

11. The method as claimed in claim 8, wherein the mold comprises a top part and a bottom part and an edge between the top part and the bottom part by a sealing element.

12. The method as claimed in claim 8, wherein the inlet opening is located at a lower part of the cavity.

13. The method as claimed in claim 8, wherein the overflow opening is located at an upper part of the cavity.

14. The method as claimed in claim 8, further comprising curing the insulation compound by a curing device.

15. The assembly as claimed in claim 1, further comprising
   a supply valve arranged on the supply line to allow the insulation compound to flow from the supply tank into the cavity while in an open position and to prevent the insulation compound from entering into the cavity from the supply while in a closed position.

16. The assembly as claimed in claim 15,
   wherein the supply valve and overflow valve are configured to be open position at the same time and to be in the closed position at the same time.

17. The method as claimed in claim 8, further comprising actuating a supply valve to shut off the flow of the insulation compound from the supply tank to the cavity.

18. The method as claimed in claim 17,
   wherein the supply valve and overflow valve are configured to both shut off the flow of insulation compound at same time and to both allow the flow of the insulation compound at same time.

19. The assembly as claimed in claim 16,
   wherein a vacuum valve is arranged on the vacuum line, and
   wherein the vacuum valve is configured to be closed when the supply valve and overflow valve are open.

20. The method as claimed in claim 18,
   wherein a vacuum valve is arranged on the vacuum line, and
   wherein the vacuum valve is closed before opening the supply valve and opening the overflow valve.

* * * * *